United States Patent
Yoshizawa

(10) Patent No.: US 7,085,417 B2
(45) Date of Patent: Aug. 1, 2006

(54) METHOD OF EFFICIENTLY CONVERTING-TO-ARRAY AND COMPRESSING DATA IN A PROCESS FOR CONVERTING MASK PATTERNS OF A LSI

(75) Inventor: Keiji Yoshizawa, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 751 days.

(21) Appl. No.: 10/067,061

(22) Filed: Feb. 4, 2002

(65) Prior Publication Data

US 2002/0105524 A1 Aug. 8, 2002

(30) Foreign Application Priority Data

Feb. 6, 2001 (JP) ..................... 2001-030006

(51) Int. Cl.
*G06K 9/46* (2006.01)

(52) U.S. Cl. .............. 382/194; 382/144; 382/224; 382/173

(58) Field of Classification Search ........... 382/194, 382/144, 224, 173, 133, 205, 265, 299; 358/1.1, 358/258, 447, 451; 348/314
See application file for complete search history.

(56) References Cited

U.S. PATENT DOCUMENTS 5,253,182 A * 10/1993 Suzuki .................... 716/21
5,557,314 A * 9/1996 Okamoto et al. ........... 347/230
5,757,409 A * 5/1998 Okamoto et al. ........... 347/230
5,790,692 A * 8/1998 Price et al. ................. 382/133

FOREIGN PATENT DOCUMENTS

| JP | 2002092064 | 3/1992 |
| JP | 05342306 | 12/1993 |
| JP | 408185180 A * | 7/1996 |
| JP | 09128421 | 5/1997 |

OTHER PUBLICATIONS

Sanchis et al., "Efficient Use of the Grammar Scale Factor to Classify Incorrect Words in Speech Recognition Verification", IEEE International Conference on Pattern Recognition, vol. 3, Sep. 2000, pps. 274–277.*

* cited by examiner

*Primary Examiner*—Anh Hong Do
(74) *Attorney, Agent, or Firm*—Paul & Paul

(57) ABSTRACT

In the method of converting-to-array according to the present invention, array configuration data is created by classifying the patterns congruent with a master pattern, which is a reference graphic for repetition, in the patterns arranged as mask patterns of a LSI, so that the number of the repetitions of the congruent pattern is the largest one when the congruent pattern is arranged repeatedly with a predetermined repetition pitch.

7 Claims, 19 Drawing Sheets

Fig.2

| MASTER GRAPHIC | CANDIDATE GRAPHIC | REPETITION PITCH | NUMBER OF REPETITIONS |
|---|---|---|---|
| A1 | A2 | P1 | 2 |
| | A3 | P2 | 5 |
| | A4 | P3 | 2 |
| | A5 | P4 | 3 |

Fig.10
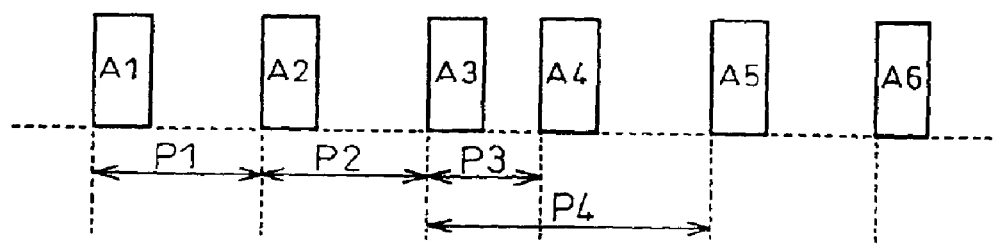
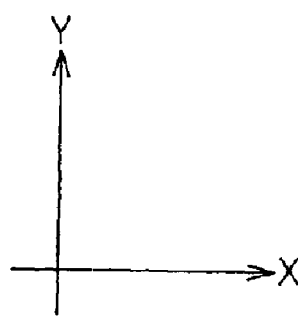

Fig.16
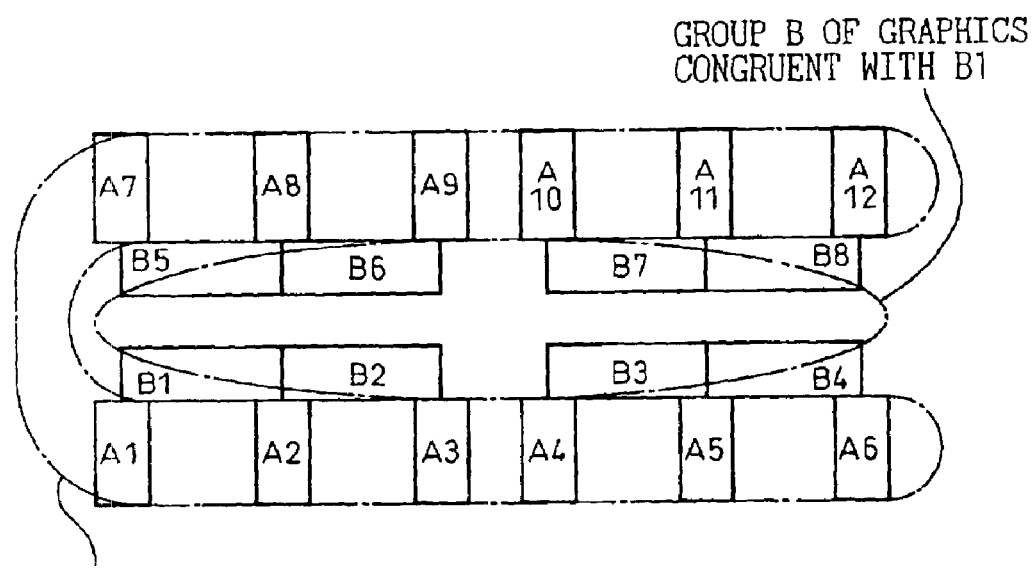
GROUP B OF GRAPHICS CONGRUENT WITH B1
GROUP A OF GRAPHICS CONGRUENT WITH A1
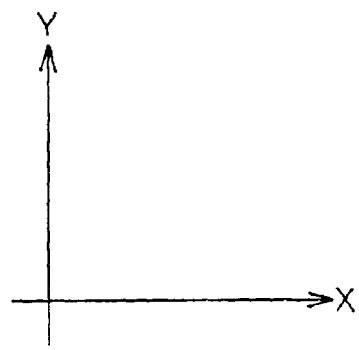

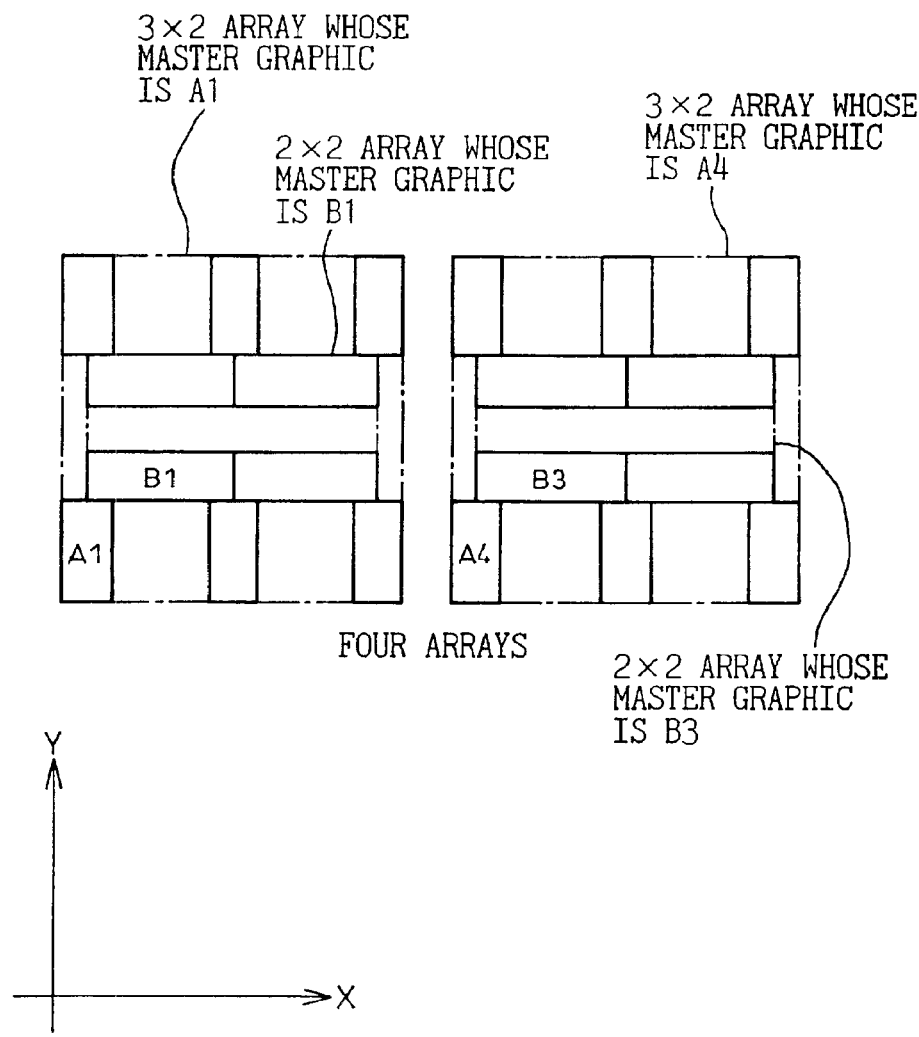

METHOD OF EFFICIENTLY CONVERTING-TO-ARRAY AND COMPRESSING DATA IN A PROCESS FOR CONVERTING MASK PATTERNS OF A LSI

BACKGROUND OF THE INVENTION

1. Field of the Invention

The present invention relates to a process for converting design data of repeated electronic circuits such as mask patterns of a LSI, and particularly to a process for converting mask data to arrays.

2. Description of the Related Art

In an integrated circuit (IC) or a large-scale integrated circuit (LSI), high density mounting of circuits is possible because of the regularity of circuit patterns, and large amount of design data is required accordingly. For this reason, it is a typical in an LSI, etc., because of the regularity of circuit patterns, that object data is compressed to a practical amount of data and then evaluations such as a logical simulation, a circuit simulation, or a design data check are performed.

For example, a process for manufacturing semi-conductor wafers includes a process for converting circuit patterns to CAM data for a photomask in order to create the photomask. In particular, since very large amount of data is handled for a LSI, a process called a "conversion-to-array process" is usually performed in this conversion process in order to decrease the amount of the mask data.

The conversion-to-array process is a process in which flat patterns arranged as mask patterns of a LSI are assumed as graphics, repeatability of the graphics is detected, and the graphics arranged in a lattice pattern are converted to array configuration data.

The array configuration is a configuration of data consisting of a master graphic, which is a reference graphic for arranging repeatedly, a repetition pitch in case that it is assumed that the master graphic is repeatedly arranged at positions in two dimensions, and the number of the repetitions.

In a conventional conversion-to-array process, array configuration data is created by selecting a master graphic, which is a reference graphic for repetition, from the graphics for mask patterns, and computing a repetition pitch which is the interval between the master graphic and a graphic just next to the master graphic, and the number of the repetitions, according to a procedure described, in detail, later.

In the conventional process, as a repetition pitch is the interval between a master graphic and a graphic congruent with and next to the master graphic for any arrangement of graphics, the computation of the repetition pitch is relatively simple, and the processing time of a computer may be kept in a practical range.

However, a useful result about the compression rate of data is not always obtained. In particular, in case that intervals between upper and lower graphics and between right and left graphics adjacent each other are not even, the number of arrays created is large, and thereby sufficient data compression may not be achieved.

It is therefore an object of the present invention to provide a method of efficiently converting-to-array and compressing data in a conversion-to-array process for mask patterns of a LSI.

SUMMARY OF THE INVENTION

In order to achieve the above object, the present invention provides a method of conversion-to-array for creating array configuration data by classifying the patterns congruent with a master pattern which is a reference graphic for repetition, in the patterns arranged as mask patterns of a LSI, so that the number of the repetitions of the congruent pattern is the largest one when the congruent pattern is arranged repeatedly with a predetermined repetition pitch.

In the conversion-to-array process according to the present invention, since the repetition pitch in case of the maximum number of the repetitions may be selected from a plurality of predetermined candidates of the repetition pitch, the repetition pitch may be optimized, and, consequently, the data may be compressed efficiently compared with the conventional method.

BRIEF DESCRIPTION OF THE DRAWINGS

The present invention will be more clearly understood from the description as set forth below with reference to the accompanying drawings wherein:

FIG. 2 shows the relation between the repetition pitch and the number of the repetitions in the arrangement shown in FIG. 1;

FIG. 10 depicts the principle of the conventional conversion-to-array process;

FIG. 16 depicts the classification of the graphics shown in FIG. 15 into some groups of congruent graphics;

FIG. 19 shows that the conversion-to-array process has been completed in the arrangement shown in FIG. 15.

DESCRIPTION OF THE PREFERRED EMBODIMENTS

Figure 1:
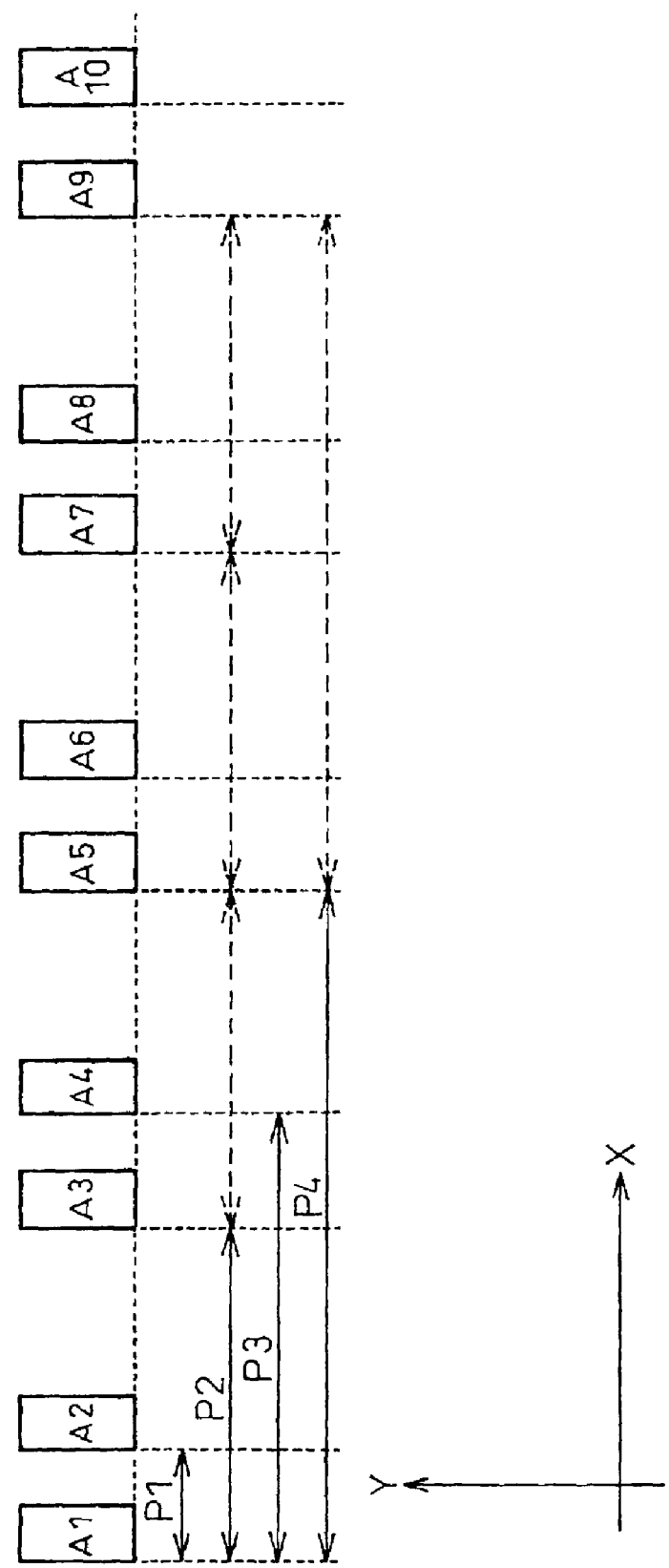
FIG. 1 depicts the principle of a conversion-to-array process according to the present invention.

Before proceeding to a detailed description of the preferred embodiments a prior art will be described with reference to the accompanying drawings relating thereto for a clearer understanding of the differences between the prior art and the present invention.

First, the principle of a conventional conversion-to-array process will be described.

FIG. 10 depicts the principle of the conventional conversion-to-array process. In this figure, the repeatedly arranged patterns of the mask patterns of a LSI are expressed as, for example, the graphics A1 to A6. It is assumed that all the graphics A1 to A6 are congruent each other.

In the conventional conversion-to-array process, a master graphic is selected as a reference graphic for the repetition on a line. Next, the interval between this master graphic and a graphic just next to the master graphic is taken as a repetition pitch. Then, a group of the graphics arranged with this repetition pitch is searched in the graphics on the same line after the master graphic. When any graphic arranged with this repetition pitch does not exist, the searching is finished, and the graphics detected by the searching are taken as one group (i.e., the graphics are converted to one array). The graphics converted to one array are excluded and the above process is performed for the graphics which have not been converted to the array. By performing such a process repeatedly, array configuration data consisting of groups of a master graphic, a repetition pitch, and the number of repetitions is created. In general, in a conversion-to-array process, at first a conversion-to-array process is performed in the X-direction (called "X-direction conversion-to-array process" hereinafter), and then a conversion-to-array process is performed in the Y-direction (called "Y-direction conversion-to-array process" hereinafter) for a flat pattern.

In the example shown in FIG. 10, at first, graphic A1 at the head of the line is taken as a master graphic, and then the "repetition pitch" which is the interval between graphic A1 and graphic A2 is computed. The repetition pitch is P1.

Next, graphics congruent with graphic A1 are searched, and it is determined whether a graphic congruent with graphic A1 exists at a distance of repetition pitch P1 from graphic A2. In case of the example in FIG. 10, graphic A3 congruent with A1 exists at a distance of repetition pitch P1 from graphic A2, and this graphic A3 is detected.

Next, graphics congruent with graphic A1 are searched again, and it is determined whether a graphic congruent with graphic A1 exists at a distance of repetition pitch P1 from graphic A3. In case of the example in FIG. 10, a graphic congruent with A1 does not exist at a distance of repetition pitch P1 from graphic A3 and, therefore, to searching graphics congruent with the master graphic A1 is finished. On the contrary, when a graphic congruent with the master graphic A1 still exist, the same process is performed again.

As described above, in case of the arrangement shown in FIG. 10, when the master graphic is graphic A1, an array having the repetition pitch of P1 and the number of repetitions of 3 is created. Graphics A1 to A3 converted to an array are excluded, and the process to create a further array is performed. This time, graphic A4 is taken as a master graphic, and the above process is performed.

The operation flow of the above conversion-to-array process will be described with reference to a specific arrangement of graphics.

Figure 13:
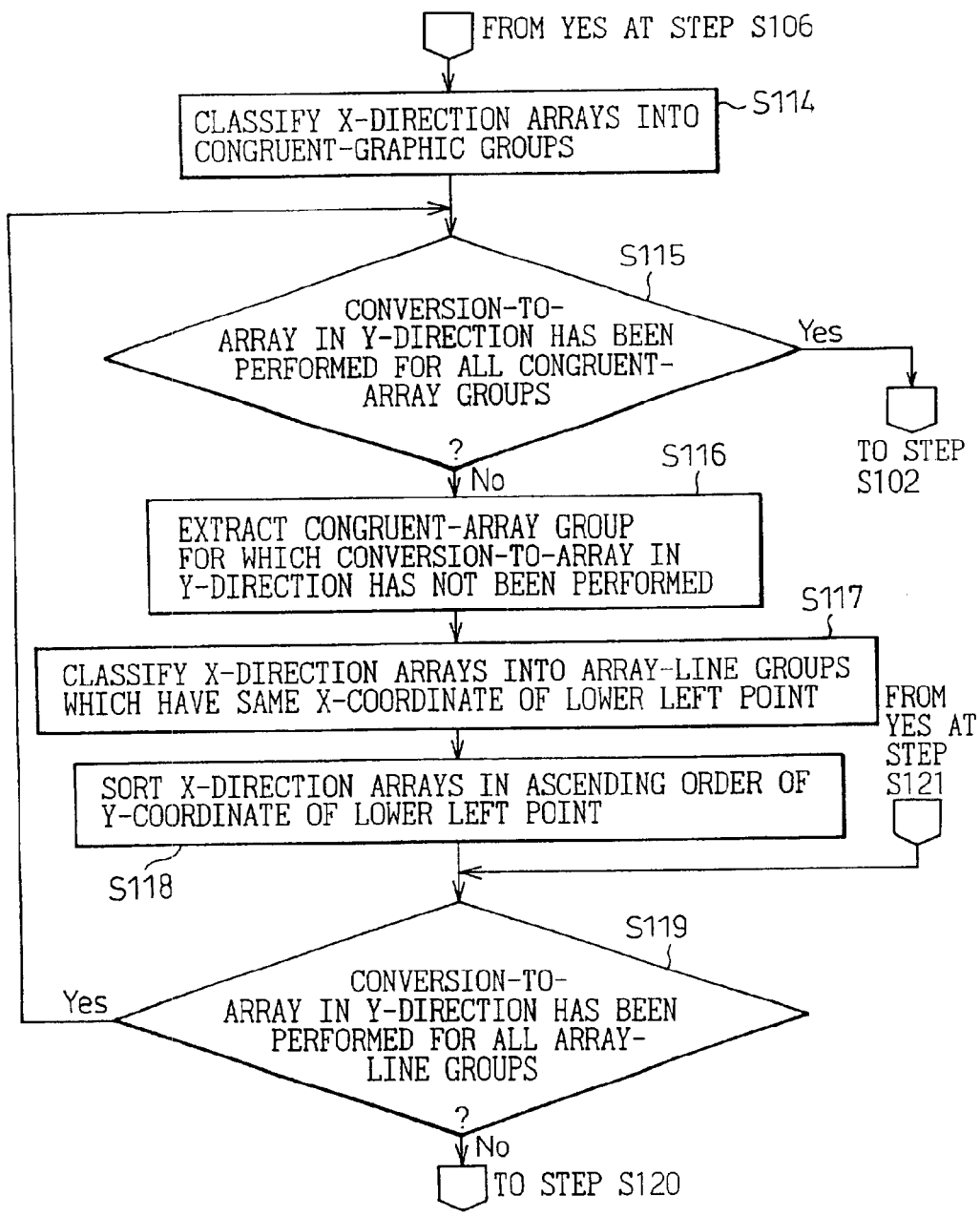
FIGS. 13 and 14 are a flow chart (2) of the conventional conversion-to-array process.
Figure 14:
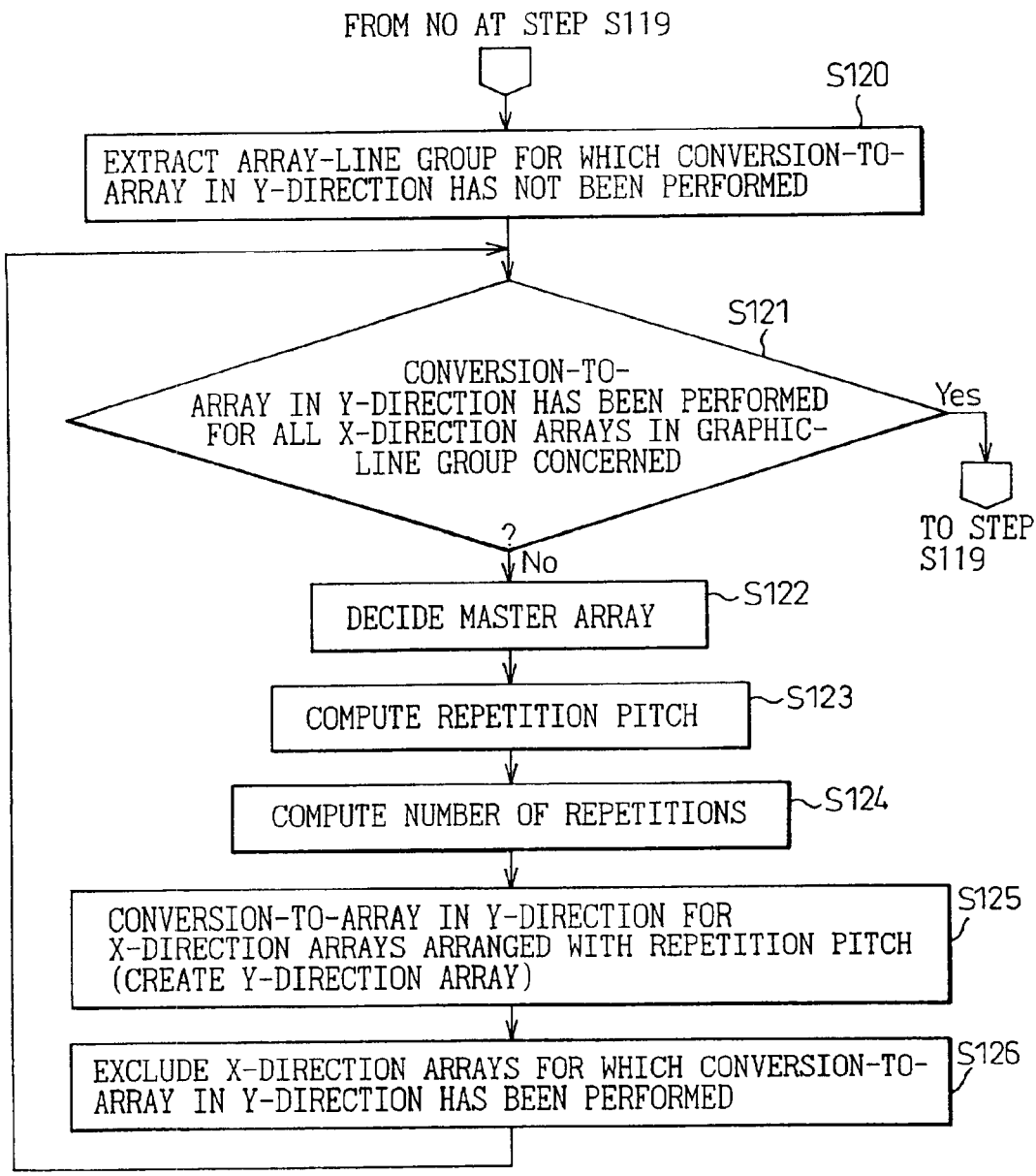
Figure 15:
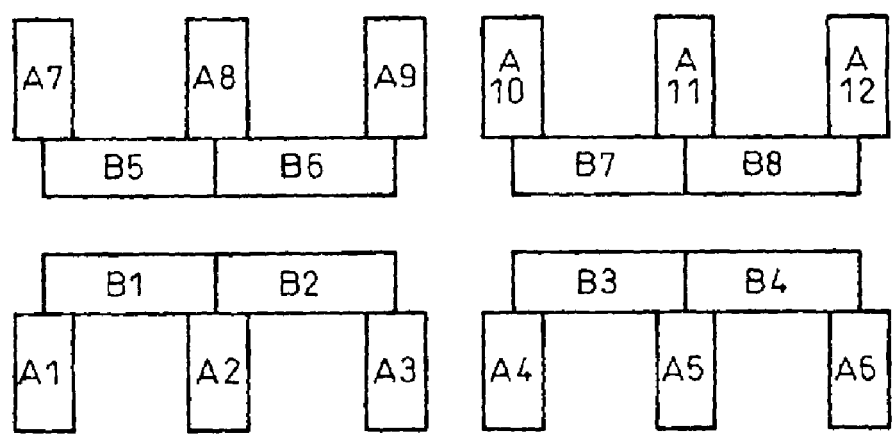
FIG. 15 shows an arrangement of the graphics to be converted to arrays.

FIGS. 11 to 14 show the flow chart of the conventional conversion-to-array process, and FIG. 15 shows an arrangement of the graphics to be converted to arrays. FIG. 16 depicts the classification of the graphics shown in FIG. 15 into some groups of congruent graphics.

This flow chart depicts the conversion-to-array process for the arrangement shown in FIG. 15 in which graphics A2 to A12 congruent with graphic A1 and graphics B2 to B8 congruent with graphic B1 are arranged. Hereafter, X-axis and Y-axis are drawn in the directions as shown in FIG. 15 on the plan where graphics exit.

At first, the X-direction conversion-to-array process will be described.

Figure 11:
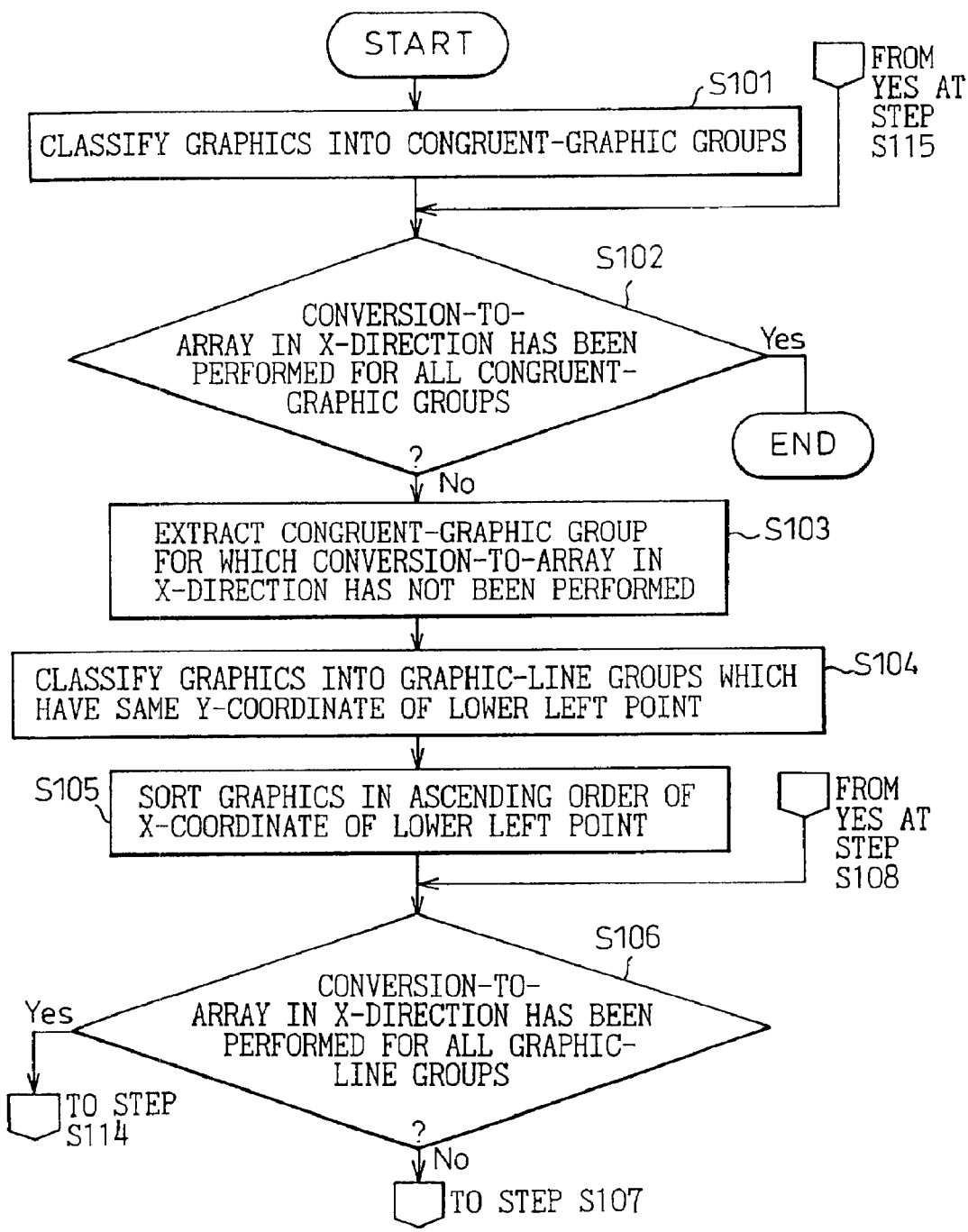
FIGS. 11 and 12 are a flow chart (1) of the conventional conversion-to-array process.
Figure 12:
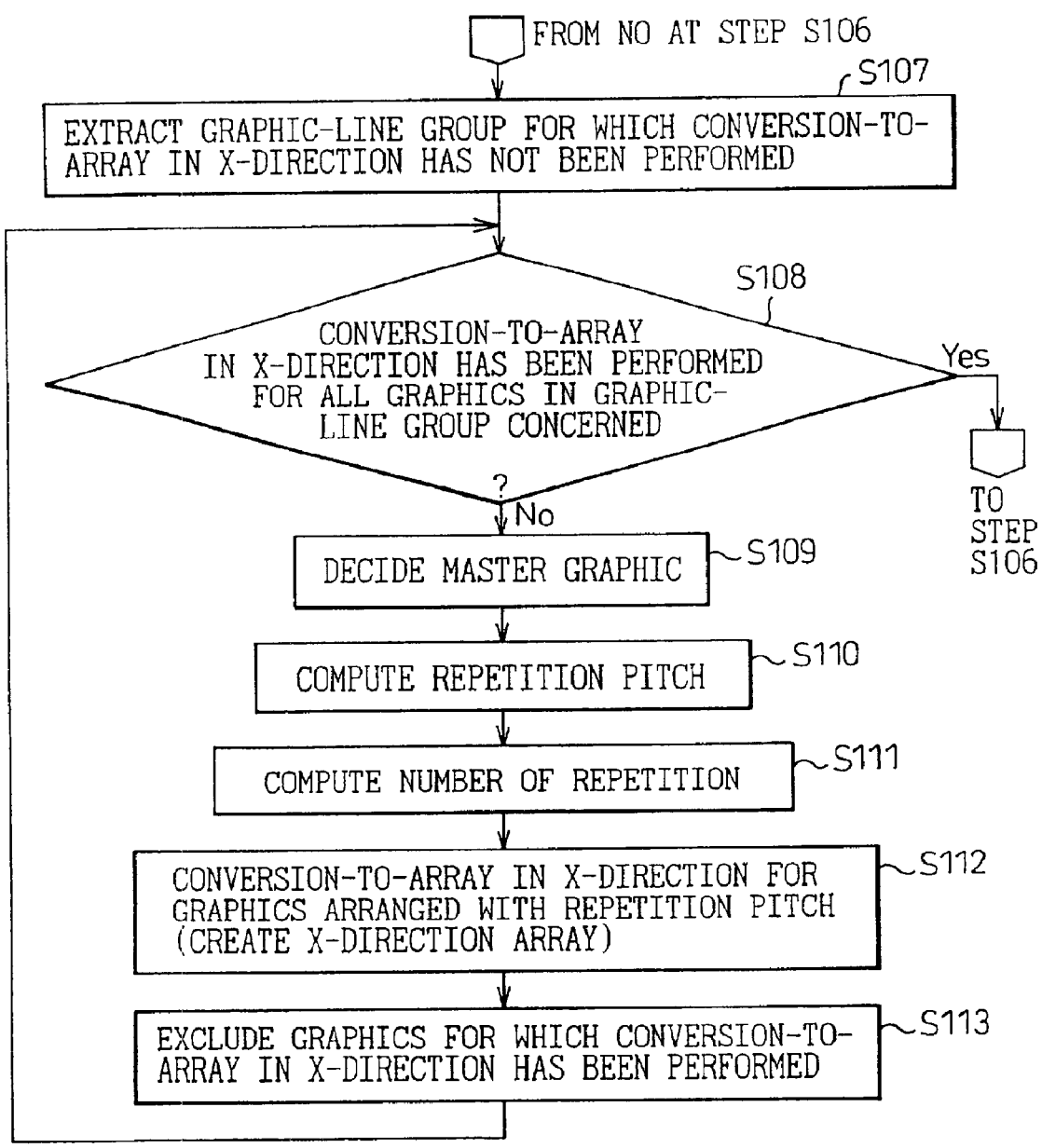

At step S101 in FIG. 11, the graphics are classified into groups of the same congruent graphics. Hereafter, the groups obtained by the classification are called "congruent-graphic group". In FIG. 16, the graphics are classified into congruent-graphic group A which is a group of graphics congruent with graphic A and congruent-graphic group B which is a group of graphics congruent with graphic B.

At step S102, it is determined whether the conversion-to-array in the X-direction has been performed for all congruent-graphic groups.

At step S103, the congruent-graphic groups for which the conversion-to-array in the X-direction has not been performed are extracted. In case of the example in FIG. 16, for example, congruent-graphic group A is extracted.

Next, at step S104, the graphics which have been classified into congruent-graphic groups are classified into groups of the graphics which have the same Y-coordinate of the lower left point thereof. Hereafter, the groups obtained by the classification are called "graphic-line groups". For example, in case of the example in FIG. 16, congruent-graphic group A is classified into a graphic-line group of A1 to A6 and a graphic-line group of A7 to A12. Further, congruent-graphic group B is classified into a graphic-line group of B1 to B6 and a graphic-line group of B5 to B8. For each of these graphic-line groups, the conversion-to-array process described with reference to FIG. 10 is performed.

Next, at step S105, the graphics in the graphic-line groups are sorted in ascending order of X-coordinate of lower left point thereof.

At step S106, it is determined whether the conversion-to-array in the X-direction has been performed for all graphic-line groups in the congruent-graphic group concerned.

At step S107, the graphic-line groups for which the conversion-to-array in the X-direction has not been performed are extracted.

At step S108, it is determined whether the conversion-to-array in the X-direction has been performed for all graphics in the graphic-line group concerned. When it is determined that the conversion-to-array in the X-direction has been performed for all graphics in the graphic-line group concerned, the process goes to step S106 to extract a further graphic-line group for which the conversion-to-array in the X-direction has not been performed. When it is determined that a graphic for which the conversion-to-array in the X-direction has not been performed exists in the graphic-line group concerned, the process returns to S109.

At step S109, it is decided that one graphic for which the conversion-to-array in the X-direction has not been performed is taken as a master graphic.

Next, at step S110, the interval between the master graphic and the graphic just next to the master graphic is computed, the computed interval is taken as a repetition pitch.

Next, at step S111, the graphics arranged with this repetition pitch in the graphic-line group concerned are searched, and the number of the repetitions in the X-direction of the master graphic is computed.

And, at step S112, the array configuration data consisting of the master graphic taken at steps S109 to S111, the repetition pitch in the X-direction, and the number of the repetitions in the X-direction (called "X-direction array" hereinafter) is created. That is, in case of the example in FIG. 16, the X-direction array for the graphics A1 to A3 is created.

Next, at step S113, the graphics for which the conversion-to-array in the X-direction has been performed are excluded, and the process returns to step S108 to perform the same process for the graphics for which the conversion-to-array in the X-direction has not been performed.

By performing the above steps S108 to S113 repeatedly, the conversion-to-array in the X-direction for all graphics in the graphic-line group concerned is performed.

When the conversion-to-array in the X-direction for all graphics in the graphic-line group concerned has been performed, the process returns to step S106. That is, by performing steps S106 to S113 repeatedly, the conversion-to-array in the X-direction for all the graphics in all the graphic-line groups, in other words, all the graphics in the congruent-graphic group concerned is performed.

FIG. 13 shows that the conversion-to-array in the X-direction for the congruent-graphics group in the arrangement shown in FIG. 15 has been completed. In the example of arrangement in FIG. 15, by the conversion-to-array process described above, the graphics in the group A are converted into the four X-direction arrays of "A1, A2, A3", "A4, A5, A6", "A7, A8, A9", and "A10, A11, A12". That is, four pieces of data of "master graphic A1, repetition pitch P1, number of repetitions 3", "master graphic A4, repetition pitch P1, number of repetitions 3", "master graphic A7, repetition pitch P1, number of repetitions 3", and "master graphic A10, repetition pitch P1, number of repetitions 3" are created as X-direction arrays.

Next, the process goes to Y-direction conversion-to-array process shown in FIGS. 13 and 14.

At step S114 in FIG. 13, all the X-direction arrays are classified into groups of the same congruent X-direction arrays. Hereafter, the groups obtained by the classification are called "congruent-array group". In the flow in FIGS. 13 and 14, when the X-direction arrays are congruent each other, the master graphics are congruent each other, and the repetition pitch and the number of repetitions of any one of the X-direction arrays are the same as those of the other X-direction arrays.

At step S115, it is determined whether the conversion-to-array in Y-direction has been performed for all congruent-array groups. If the conversion-to-array in Y-direction has been performed, the process goes to step S102, and if not, the process goes to step S116.

At step S116, the congruent-array groups for which the conversion-to-array in the Y-direction has not been performed are extracted.

Next, at step S117, the X-direction arrays which have been classified into congruent-array groups are classified into groups of the X-direction arrays which has the same X-coordinate of the lower left point of the master graphic in the X-direction array. Hereafter, the groups obtained by the classification are called "array-line group". For example, in case of FIG. 17, the X-direction arrays are classified into the array-line group of "A1, A2, A3" and "A7, A8, A9" and the array-line group of "A4, A5, A6" and "A1, A11, A12". For each of these array-line groups, the conversion-to-array process in Y-direction is performed.

Next, at step S118, the X-direction arrays in the array-line groups are sorted in ascending order of Y-coordinates of lower left point thereof.

At step S119, it is determined whether the conversion-to-array in the Y-direction has been performed for all array-line groups.

At step S120, the array-line groups for which the conversion-to-array in the Y-direction has not been performed are extracted.

At step S121, it is determined whether the conversion-to-array in the Y-direction has been performed for all X-direction arrays in the array-line group concerned. When it is determined that the conversion-to-array in the Y-direction has been performed for all X-direction arrays in the array-line group concerned, the process goes to step S119 to extract a further array-line group for which the conversion-to-array in the Y-direction has not been performed. When it is determined that a X-direction array for which the conversion-to-array in the Y-direction has not been performed exists in the array-line group concerned, the process goes to step S122.

At step S122, one X-direction array for which the conversion-to-array in the Y-direction has not been performed is taken as a master array.

Next, at step S123, the interval between the master array and the array just next to the master array is computed, and the computed interval is taken as a repetition pitch.

Next, at step S124, the X-direction arrays arranged with this repetition pitch in the array-line group concerned are searched, and the number of the repetitions in Y-direction of the master array is computed.

At step S125, one piece of array configuration data consisting of the master array, the repetition pitch in Y-direction, and the number of repetitions in Y-direction (called "Y-direction array" hereinafter) taken at steps S122 to S124 is created.

Next, at step S126, the graphics for which the conversion-to-array in the Y-direction has been performed are excluded, and the process returns to step S121 to perform the above process for the X-direction arrays for which the conversion-to-array in the Y-direction has not been performed.

By performing the above steps S121 to S126 repeatedly, the conversion-to-array in the Y-direction for all X-direction arrays in the array-line group concerned is performed.

When the conversion-to-array in the Y-direction for all X-direction arrays in the array-line group concerned has been performed, the process returns to step S119. By performing steps S119 to S126 repeatedly, the conversion-to-array in Y-direction for all the X-direction arrays in all the array-line groups, in other words, all the X-direction arrays in the congruent-array group concerned is performed.

When the conversion-to-array in Y-direction has been performed for all X-direction array in the congruent-array group concerned, the process returns to step S115. And, by performing steps S115 to S126 repeatedly, the conversion-to-array in the Y-direction for all the X-direction arrays in all the congruent-array groups is performed. In other words, the conversion-to-array process for all the graphics in the congruent-graphic group concerned is completed.

Figure 17:
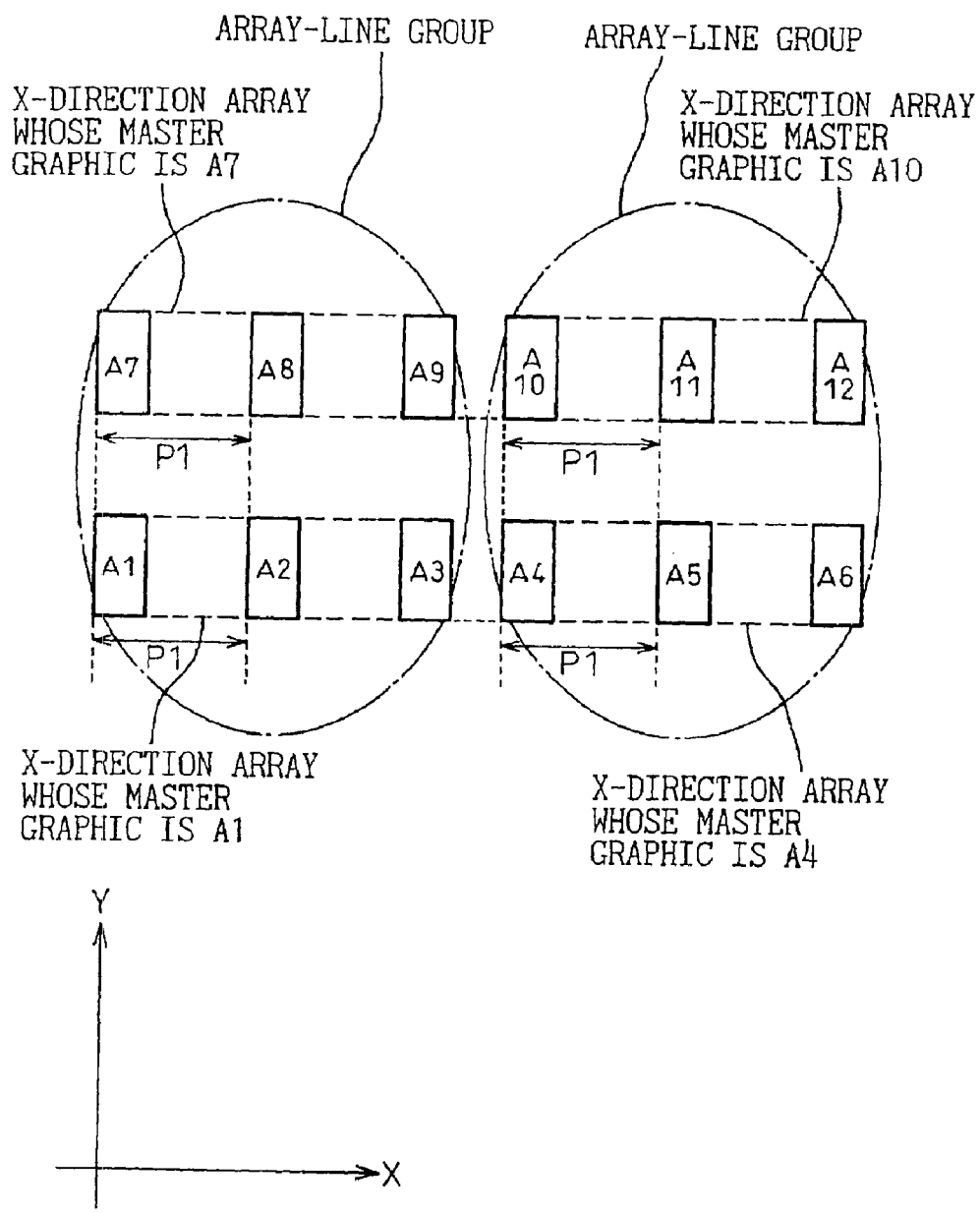
FIG. 17 shows that the conversion-to-array in the X-direction has been completed for the congruent-graphic groups in the arrangement shown in FIG. 15.
Figure 18:
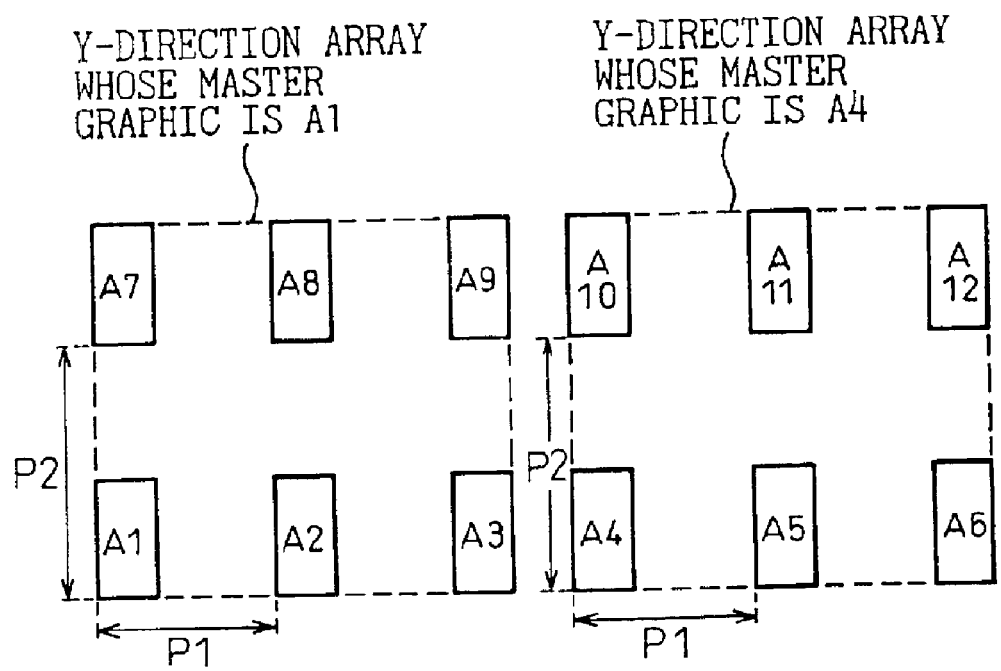
FIG. 18 shows that the conversion-to-array in the Y-direction has been completed for the congruent-array groups in the arrangement shown in FIG. 17.

FIG. 18 shows that the conversion-to-array in the Y-direction for the congruent-array groups in the arrangement shown in FIG. 17 has been completed.

By the conversion-to-array process in Y-direction described above, for example, the graphics in the group A are converted into the two Y-direction arrays of "A1, A2, A3, A7, A8, A9", and "A4, A5, A6, A10, A11, A12". That is, a 3×2 array of "master graphic A1, X-direction repetition pitch P1, number of X-direction repetition 3, Y-direction repetition pitch P2, number of Y-direction repetition 2", and a 3×2 array of "master graphic A4, X-direction repetition pitch P1, number of X-direction repetition 3, Y-direction repetition pitch P2, number of Y-direction repetition 2" are created.

When the conversion-to-array for all graphics in the congruent-graphic group concerned described above has been performed, the process returns to step S102. That is, by performing steps S102 to S126 repeatedly, the conversion-to-array for all the graphics in all the congruent-graphic groups is performed.

FIG. 19 shows that the conversion-to-array in the arrangement shown in FIG. 15 has been completed.

AS shown in FIG. 19, the graphics in the example of arrangement as shown in FIG. 15 are converted into the array configuration data, by the conversion-to-array process, having four arrays of a 3×2 array whose master graphic is A1, a 3×2 array whose master graphic is A4, a 2×2 array whose master graphic is B1, and a 2×2 array whose master graphic is B3.

As described above, in the conventional method, array configuration data is created by selecting a master graphic which is a reference graphic for repetition from the graphics for mask patterns, and computing a repetition pitch which is the interval between the master graphic and a graphic just next to the master graphic, and the number of the repetitions.

The above is the principal of the conventional conversion-to-array process.

Next, the principal of the conversion-to-array process according to the present invention will be described.

FIG. 1 depicts the principle of the conversion-to-array process according to the present invention. In this figure, the patterns arranged repeatedly on the mask patterns of a LSI are expressed as the graphics A1 to A10. As an example, it is assumed that all the graphics A1 to A10 are congruent each other.

In the method of conversion-to-array according to the present invention, when it is assumed that the flat patterns arranged as mask patterns of a LSI are graphics, array configuration data may be created by classifying the graphics congruent with a master graphic, which is a reference graphic for repetition, so that the number of the repetitions of the congruent graphic is the largest one when the congruent graphic is arranged repeatedly with a predetermined repetition pitch.

The repetition pitch in case of the maximum number of the repetitions may be selected from a plurality of predetermined candidates of the repetition pitch. The candidates of the repetition pitch may be created by computing the intervals between the master graphic and a plurality of the graphics near the master graphic.

In the example shown in FIG. 1, the number of the candidates of the repetition pitch is set to, for example, "4". This number does not restrict the present invention, and other numbers may be available.

At first, graphic A1 at the head of the line is taken as a master graphic. Next, the graphics near the master graphic A1 are selected as candidate graphics. The candidate graphics are selected in increasing order of distance from the master graphic A1. That is, in the example shown in FIG. 1, four graphics of A2 to A5 are the candidate graphics.

Next, intervals between the master graphic A1 and the candidate graphics A2 to A5 are computed, and the computed intervals are taken as candidates of repetition pitch. In the example shown in FIG. 1, P1 to P4 are the candidates of repetition pitch.

Next, the number of the repetitions of the master graphic A1 which is repeated with the repetition pitch of candidate P1 to P4 starting at the master graphic A1 is computed. In the example shown in FIG. 1, "A2" is the graphic repeated with repetition pitch P1, "A3, A5, A7, A9" are the graphics repeated with repetition pitch P2, "A4" is the graphic repeated with repetition pitch P3, and "A5, A9" are the graphics repeated with repetition pitch P4.

FIG. 2 shows the relation between the repetition pitch and the number of the repetitions in the arrangement shown in FIG. 1.

From FIG. 2, it is clear that the number of the repetitions is the largest one in case that the repetition pitch is P2. For this reason, in the method of conversion-to-array according to the present invention, arrays are created on the condition that the repetition pitch is P2. In the example in FIG. 1, the array of "master graphic A1, repetition pitch P2, number of repetition 5" is created.

And, the graphics A1, A3, A5, A7 and A9 which have been converted to the array are excluded, and the process to create a further array is performed. That is, the same process is performed on condition that, for example, graphic A2 is a master graphic.

The operation flow of the conversion-to-array process according to the present invention is described below.

FIGS. 3 to 6 show a flow chart of the conversion-to-array process according to the present invention.

Also in the conversion-to-array process according to the present invention, at first the conversion-to-array process is performed in the X-direction (X-direction conversion-to-array process), and then the conversion-to-array process is performed in the Y-direction (Y-direction conversion-to-array process) for flat patterns, as the conventional conversion-to-array process.

Figure 3:
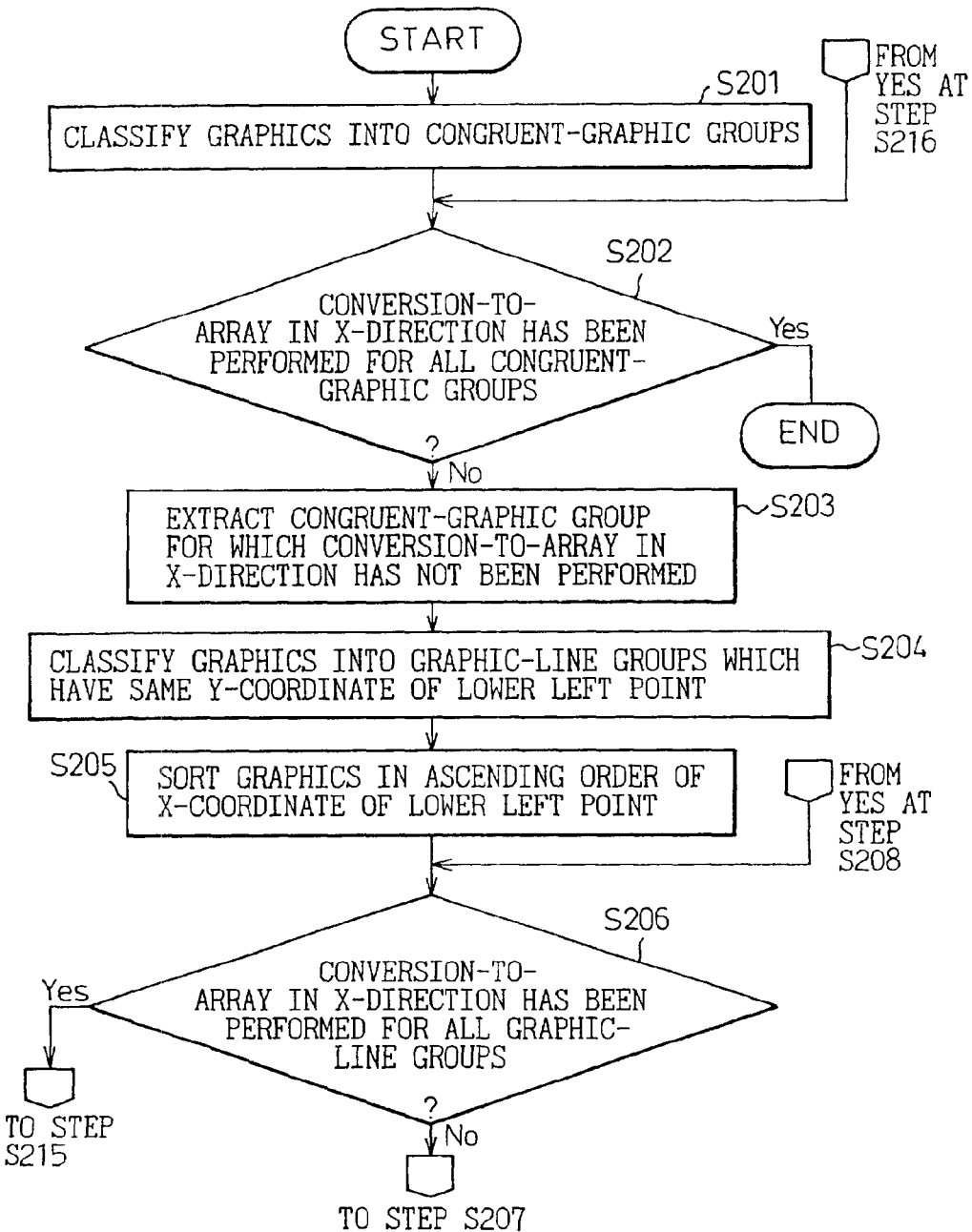
FIGS. 3 and 4 are a flow chart (1) of the conversion-to-array process according to the present invention.
Figure 4:
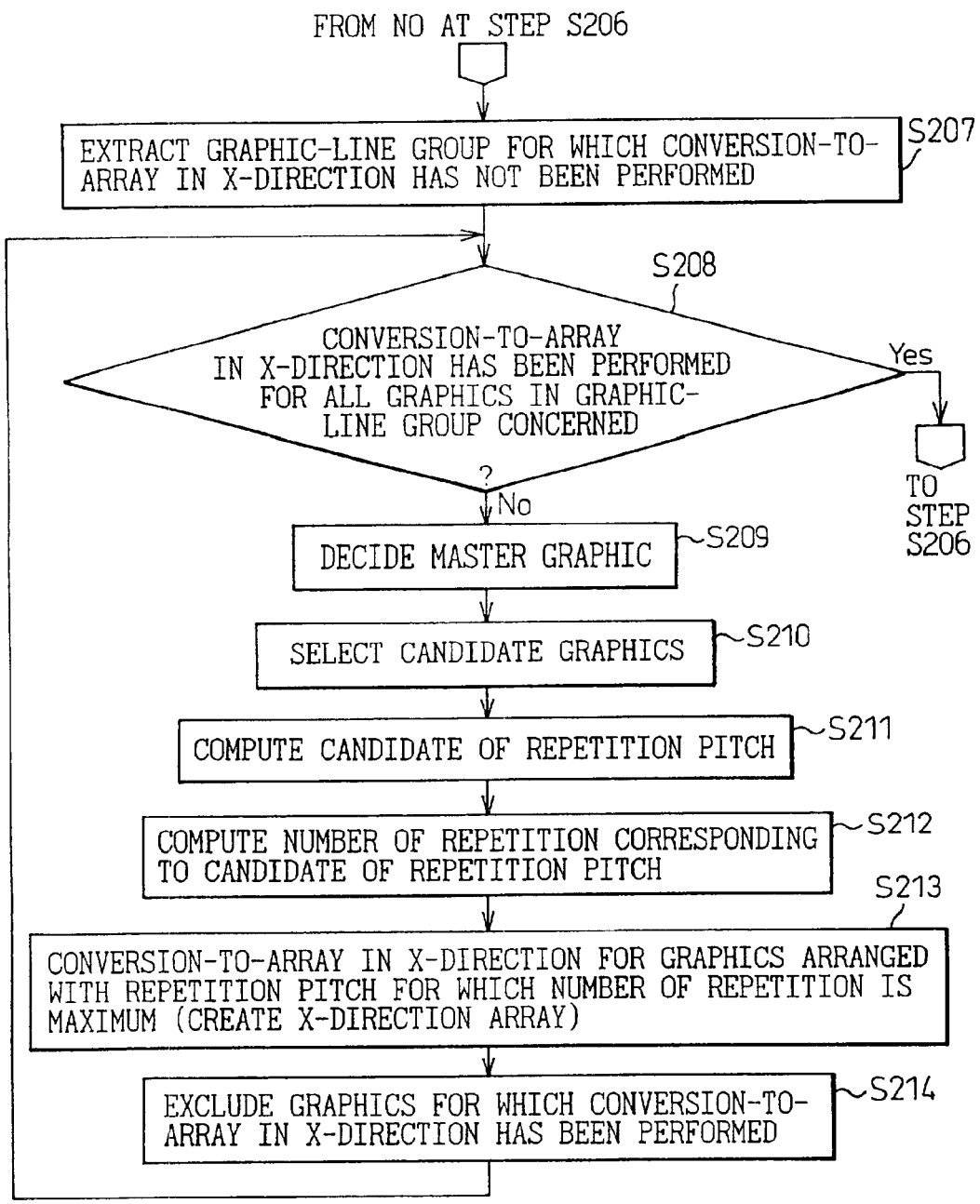

At step S201 in FIG. 3, all the graphics are classified into congruent-graphic groups of the same congruent graphics.

At step S202, it is determined whether the conversion-to-array in the X-direction has been performed for all congruent-graphic groups.

At step S203, the congruent-graphic groups for which the conversion-to-array in the X-direction has not been performed are extracted.

Next, at step S204, the graphics which have been classified into congruent-graphic groups are classified into groups of the graphics which have the same Y-coordinate of the lower left point thereof to create graphic-line groups. For each of these graphic-line groups, the conversion-to-array process described with reference to FIG. 1 is performed.

At step S205, the graphics in the graphic-line groups are sorted in ascending order of X-coordinate of lower left point thereof.

At step S206, it is determined whether the conversion-to-array in the X-direction has been performed for all graphic-line groups in the congruent-graphic group concerned.

At step S207, the graphic-line groups for which the conversion-to-array in the X-direction has not been performed are extracted.

At step S208, it is determined whether the conversion-to-array in the X-direction has been performed for all graphics in the graphic-line group concerned. When it is determined that the conversion-to-array in the X-direction has been performed for all graphics in the graphic-line group concerned, the process goes to step S206 to extract a further graphic-line group for which the conversion-to-array in the X-direction has not been performed. When it is determined that a graphic for which the conversion-to-array in the X-direction has not been performed exists in the graphic-line group concerned, the process goes to S209.

At step S209, one graphic for which the conversion-to-array in the X-direction has not been performed is taken as a master graphic. In case of the example shown in FIG. 1, graphic A1 is taken as a master graphic.

Next, at step S210, a predetermined number of graphics near the master graphic are selected as candidate graphics.

In the example shown in FIG. 1, the number of candidate graphics is "4", and graphics A2 to A5 are the candidate graphics.

Next, at step S211, the intervals between the master graphic and the candidate graphics are computed to obtain candidates of repetition pitch in the X-direction. In the example shown in FIG. 1, P1 to P4 are the candidates.

Next, at step S212, the graphics arranged in the X-direction with the candidates of repetition pitch in the graphic-line group concerned are searched starting at the master graphic, and the number of the repetitions in the X-direction of the graphics repeated with the candidates of repetition pitch is computed. In the example shown in FIG. 1, the number of repetitions of the graphic repeated with repetition pitch P1 is "2", the number of repetitions of the graphic repeated with repetition pitch P2 is "5", the number of repetitions of the graphic repeated with repetition pitch P3 is "2", and the number of repetitions of the graphic repeated with repetition pitch P4 is "3".

And, at step S213, by using the repetition pitch in the X-direction for which the number of repetitions is the largest one, the conversion-to-array in the X-direction is performed for the graphics. That is, one X-direction array is created with the master graphic, the repetition pitch in X-direction for which the number of repetitions is the largest one, and the number of repetitions concerned. In the example shown in FIG. 1, since the graphics A1, A3, A5, A7, and A9 are converted to a X-direction array, the X-direction array of "master graphic A1, repetition pitch P2, number of repetition 5" is created.

Next, at step S214, the graphics for which the conversion-to-array in the X-direction has been performed are excluded, and the process returns to step S208 to perform the same process for the graphics for which the conversion-to-array in the X-direction has not been performed. In the example in FIG. 1, the graphics A1, A3, A5, A7, and A9 for which the conversion-to-array in X-direction has been performed are excluded, and the process returns to step S208 to create the X-direction array for which for example graphic A2 is taken as the master graphic.

By performing the above steps S208 to S214 repeatedly, the conversion-to-array in X-direction for all graphics in the graphic-line group concerned is performed.

When the conversion-to-array in the X-direction for all graphics in the graphic-line group concerned has been performed, the process returns to step S206. That is, by performing steps S206 to S214 repeatedly, the conversion-to-array in the X-direction for all the graphics in all the graphic-line groups, in other words, all the graphics in the congruent-graphic group concerned is performed.

Figure 7:
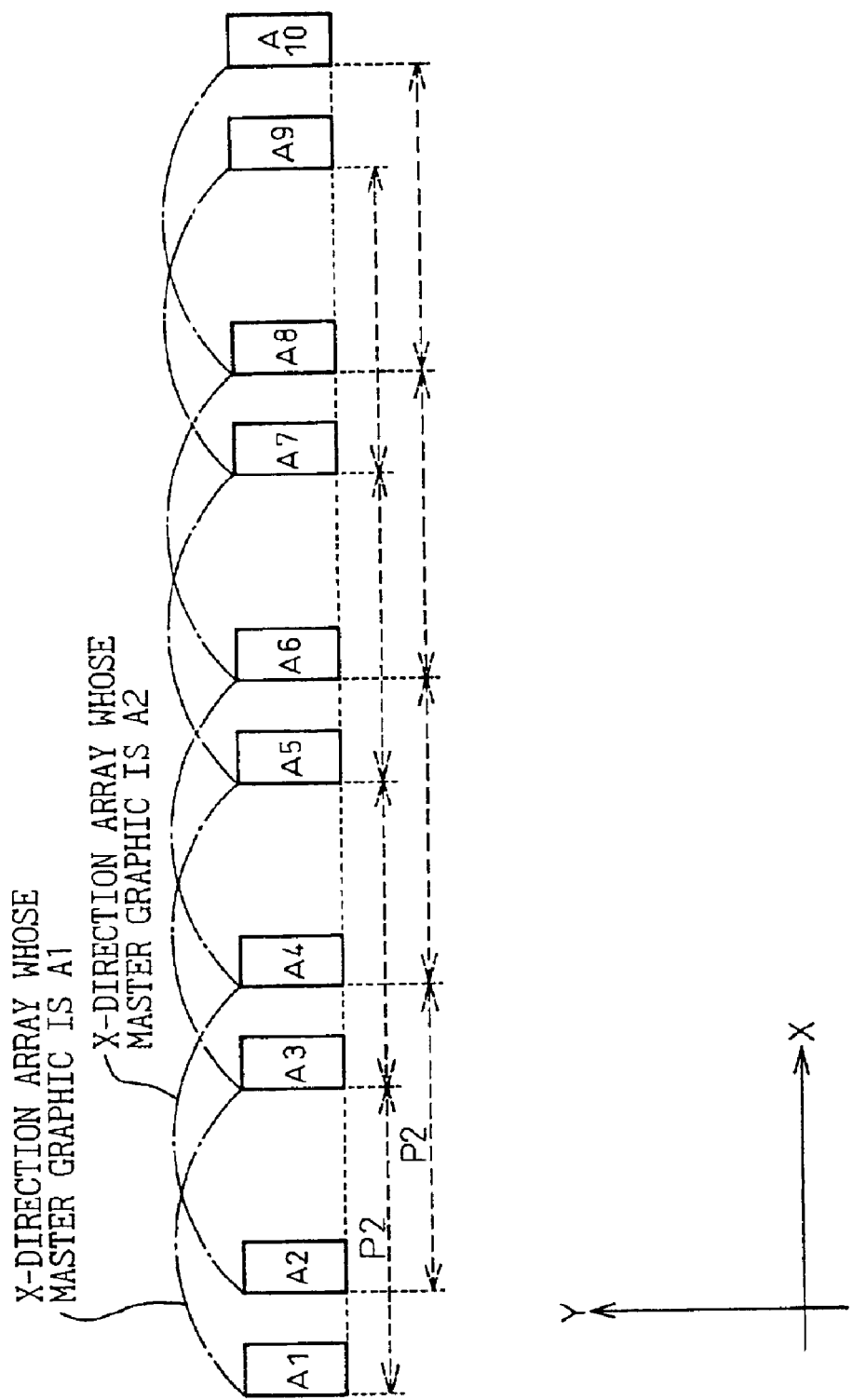
FIG. 7 shows that the conversion-to-array in the X-direction has been completed for the congruent-graphic groups in the conversion-to-array process according to the present invention.

FIG. 7 shows that the X-direction conversion-to-array for the congruent-graphics groups has been completed in the conversion-to-array process according to the present invention.

By the X-direction conversion-to-array described above, the graphics are converted into the two X-direction arrays of "A1, A3, A5, A7, A9" and "A2, A4, A6, A8, A10". That is, two pieces of data of "master graphic A1, repetition pitch P2, number of repetitions 5", and "master graphic A2, repetition pitch P2, number of repetitions 5" are created as X-direction arrays.

Figure 5:
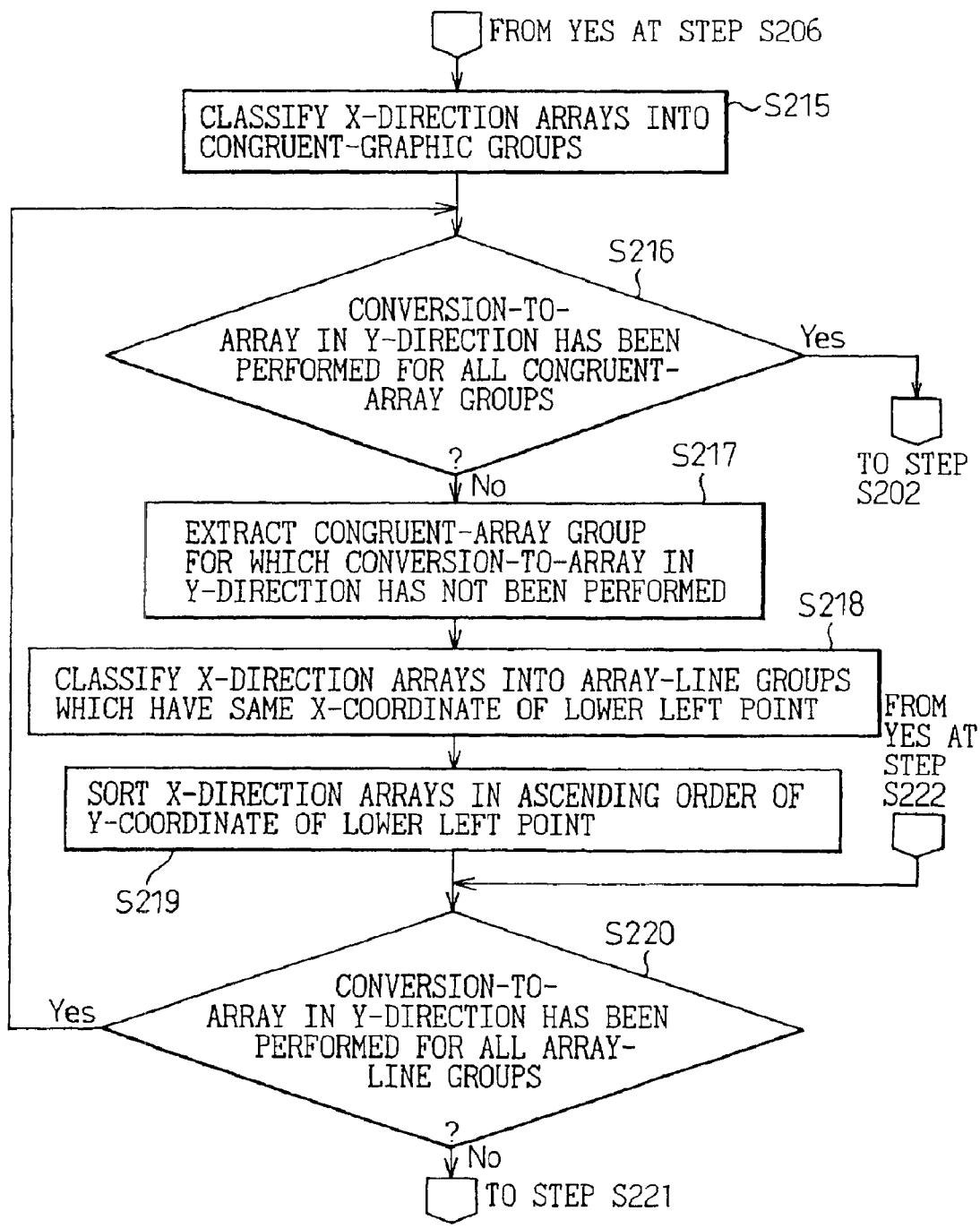
FIGS. 5 and 6 are a flow chart (2) of the conversion-to-array process according to the present invention.
Figure 6:
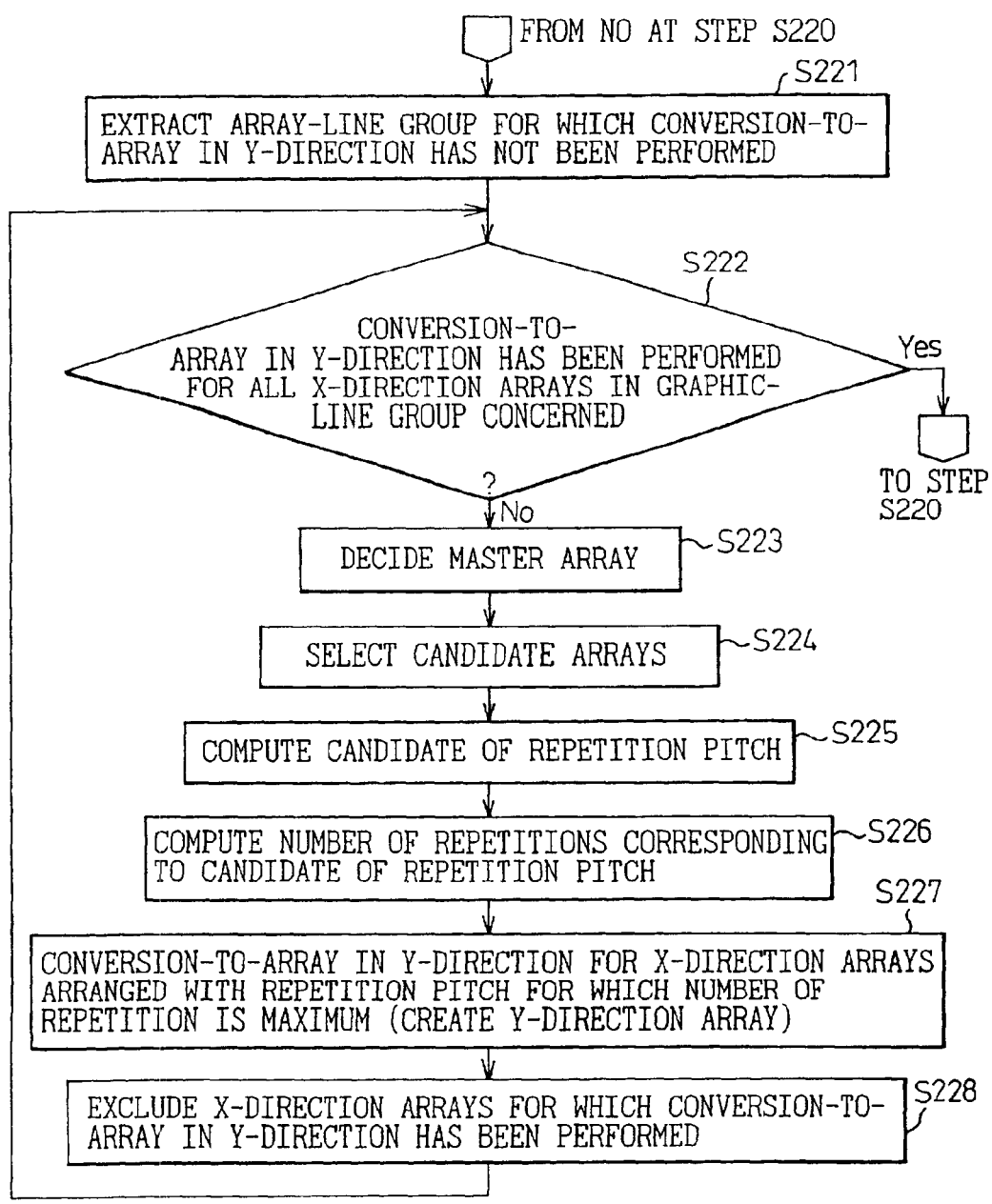

At step S215 in FIG. 5, the X-direction arrays are classified to the groups of the same congruent X-direction arrays to create the "congruent-array groups". When the X-direction arrays are congruent each other, the master graphics are congruent each other, and the repetition pitch and the number of repetitions of any one of the X-direction arrays are the same as ones of the other X-direction arrays.

At step S216, it is determined whether the conversion-to-array in the Y-direction has been performed for all congruent-array groups. If the conversion-to-array in Y-direction has been performed, the process goes to step S202, and if not, the process goes to step S217.

At step S217, the congruent-array groups for which the conversion-to-array in the Y-direction has not been performed are extracted.

Next, at step S218, the X-direction arrays which have been classified into congruent-array groups are classified into groups of the X-direction arrays which has the same X-coordinate of the lower left point of the master graphic in the X-direction array.

Next, at step S219, the X-direction arrays in the array-line groups are sorted in ascending order of Y-coordinate of lower left point thereof.

At step S220, it is determined whether the conversion-to-array in the Y-direction has been performed for all array-line groups.

At step S221, the array-line groups for which the conversion-to-array in the Y-direction has not been performed are extracted.

At step S222, it is determined whether the conversion-to-array in the Y-direction has been performed for all X-direction arrays in the array-line group concerned. When it is determined that the conversion-to-array in the Y-direction has been performed for all X-direction arrays in the array-line group concerned, the process goes to step S220 to extract a further array-line group for which the conversion-to-array in Y-direction has not been performed. When it is determined that a X-direction array for which the conversion-to-array in Y-direction has not been performed exists in the array-line group concerned, the process goes to S223.

At step S223, it is decided that one X-direction array for which the conversion-to-array in Y-direction has not been performed is taken as a master array.

Next, at step S224, a predetermined number of the X-direction arrays near the master array are selected as candidate arrays. The candidate arrays are selected in increasing order of distance from the master array. The number of candidate arrays may be equal to, or not equal to, the number of the candidate graphics selected at step S210.

Next, at step S225, the intervals between the master array and the candidate arrays are computed to obtain the candidates of repetition pitch in the Y-direction.

Next, at step S226, the X-direction arrays arranged in Y-direction with the candidates of repetition pitch in the array-line group concerned are searched starting at the master array, and the number of the repetition in Y-direction of the X-direction arrays repeated with the candidates of repetition pitch is computed.

At step S227, by using the repetition pitch in Y-direction for which the number of repetitions in Y-direction is the largest one, the conversion-to-array in Y-direction is performed for the X-direction arrays. That is, one Y-direction array is created with the master array, the repetition pitch in Y-direction for which the number of repetitions in the Y-direction is the largest one, and the number of repetition concerned.

Next, at step S228, the graphics for which the conversion-to-array in the Y-direction has been performed are excluded, and the process returns to step S222 to perform the above process for the X-direction arrays for which the conversion-to-array in the Y-direction has not been performed.

By performing the above steps S222 to S228 repeatedly, the conversion-to-array in the Y-direction for all the X-direction arrays in the array-line group concerned is performed.

When the conversion-to-array in the Y-direction for all the X-direction arrays in the array-line group concerned has been performed, the process returns to step S220. By performing steps S220 to S228 repeatedly, the conversion-to-array in the Y-direction for all the X-direction arrays in all the array-line groups, in other words, all the X-direction arrays in the congruent-array group concerned is performed.

When the conversion-to-array in the Y-direction for all the X-direction arrays in the congruent-array group concerned has been performed, the process returns to step S216. By performing steps S216 to S228 repeatedly, the conversion-to-array in the Y-direction for all the X-direction arrays in all the congruent-array groups is performed. In other words, the conversion-to-array process for all the graphics in the congruent-graphic group concerned is completed.

When the conversion-to-array for all the graphics in the congruent-graphic group concerned has been performed, the process returns to step S202. By performing steps S202 to S228 repeatedly, the conversion-to-array for all the graphics in all the congruent-graphic groups is performed. The array configuration data consists of a master graphic which is a reference graphic for repetition, repetition pitches in the X-direction and the Y-direction, and the numbers of the repetitions in the X-direction and the Y-direction.

Figure 8:
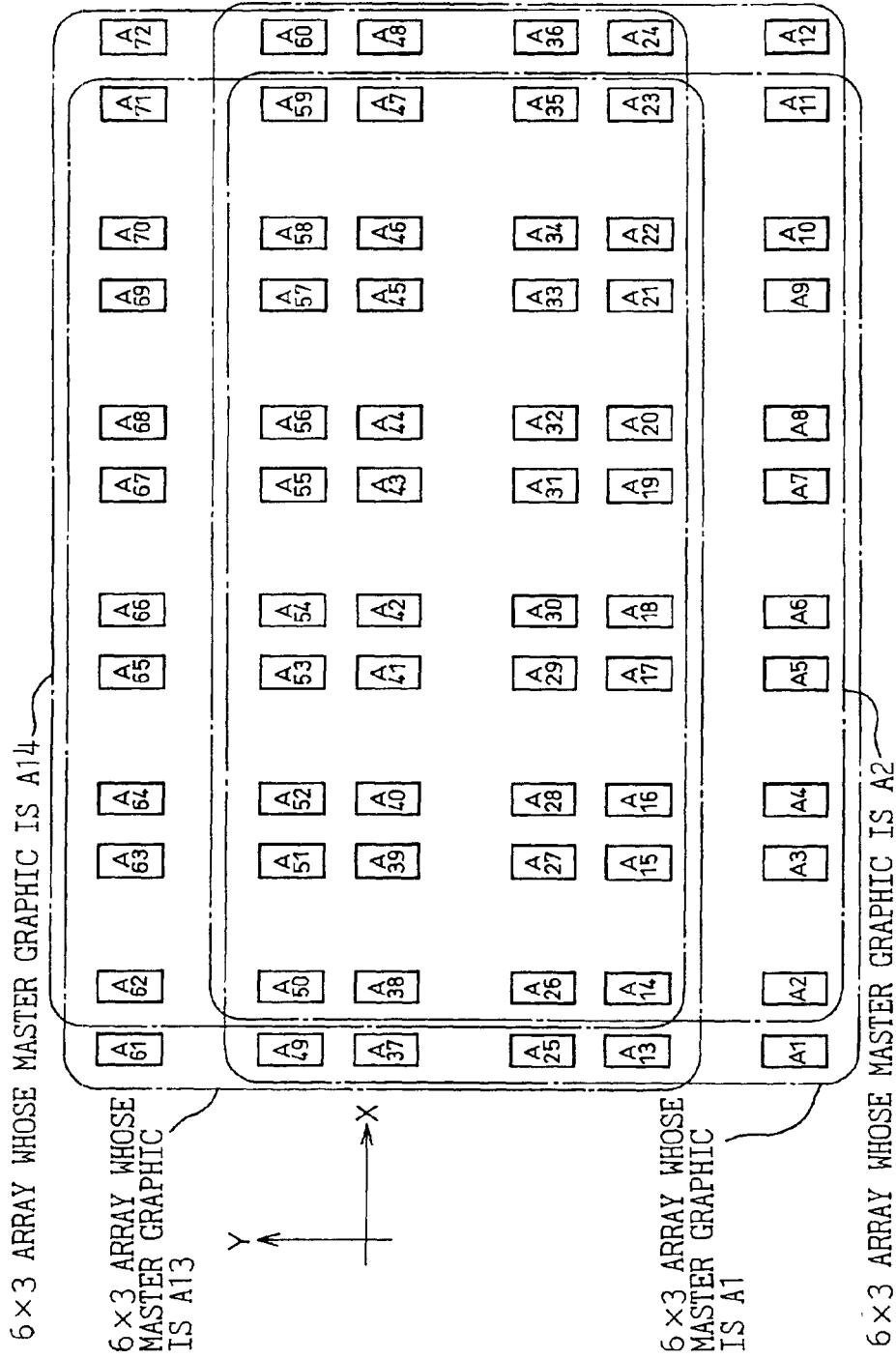
FIG. 8 shows a result of the conversion-to-array process according to the present invention.
Figure 9:
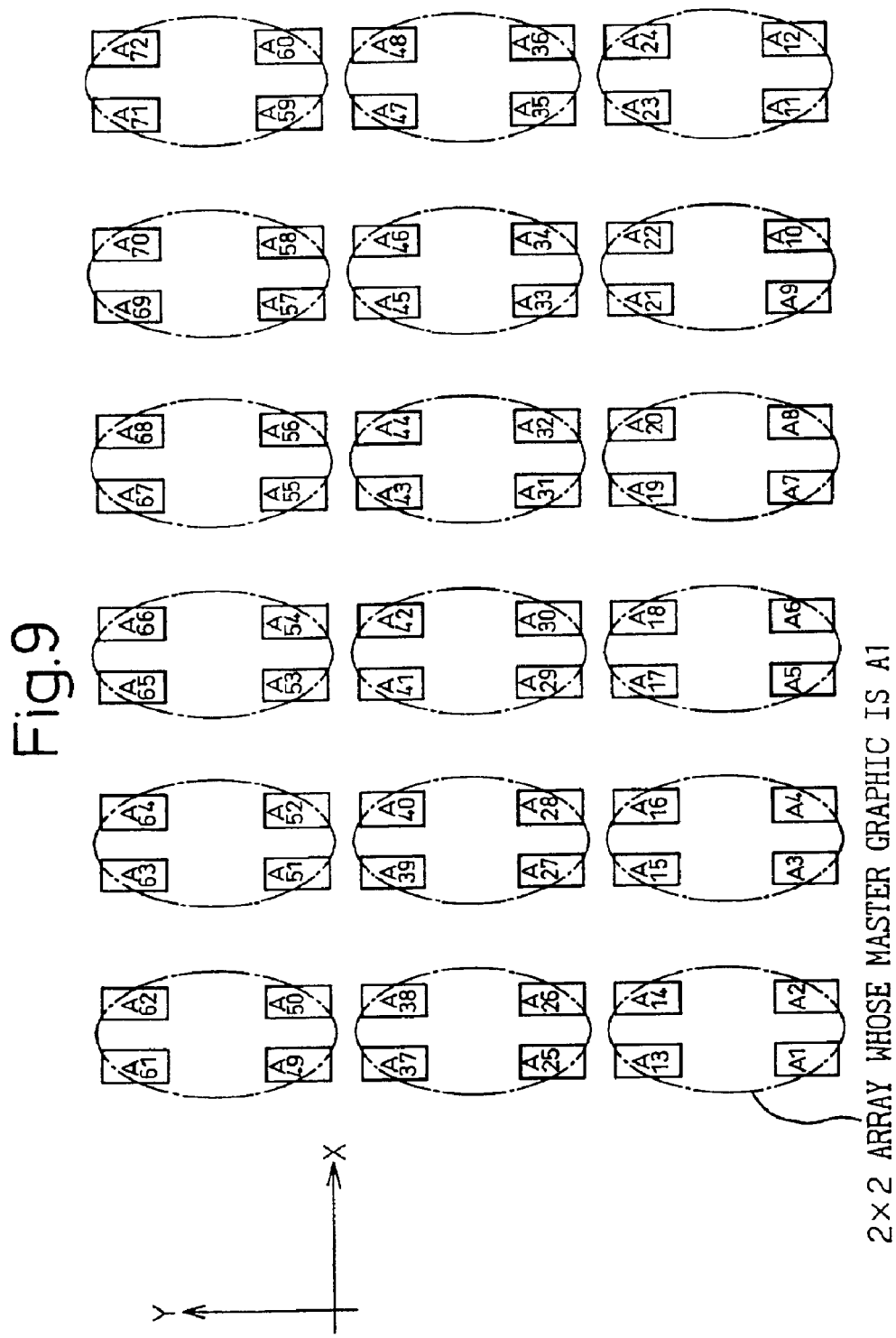
FIG. 9 shows a result of a conventional conversion-to-array process.

FIG. 8 shows a result in the conversion-to-array process according to the present invention, and FIG. 9 shows a result in the conventional conversion-to-array process.

FIGS. 8 and 9 show the results by the respective methods of conversion-to-array in case that the patterns arranged repeatedly for the mask patterns of a LSI are the congruent graphics A1 to A72. In such graphic arrangement, as shown in FIG. 8, the conversion-to-array process according to the present invention creates the four arrays of a 6×3 array whose master graphic is A1, a 6×3 array whose master graphic is A2, a 6×3 array whose master graphic is A13, and a 6×3 array whose master graphic is A14 from the 72 graphics. On the contrary, the conventional conversion-to-array process creates, as shown in FIG. 9, as many as 18 arrays including a 2×2 array whose master array is A1 from the 72 graphics. From the above results, it is clear that the data compression by the conventional conversion-to-array process is not sufficient compared with that by the present invention, and the method of conversion-to-array according to the present invention is effective.

As described above, in the conversion-to-array process according to the present invention, array configuration data is created by classifying the patterns congruent with a master pattern, which is a reference graphic for repetition, in the patterns arranged as mask patterns of a LSI, so that the number of the repetitions of the congruent pattern is the largest one when the congruent pattern is arranged repeatedly with a predetermined repetition pitch.

In the above process, the repetition pitch in case that the number of repetitions is the largest one may be selected from a plurality of predetermined candidates of repetition pitch, and thus the optimum repetition pitch may be selected, and consequently the data may be compressed efficiently compared with the conventional process.

Furthermore, in the conversion-to-array process according to the present invention, as the number of arrays created may be considerably decreased although the number of computations increases as many as a plurality of candidates of repetition pitch are computed, the processing time of the computer to perform the conversion-to-array process may fall well within the allowable range.

Thus, the memory resources in the processing apparatus such as a computer for performing the conversion of mask patterns of LSI may be saved significantly, and the data transfer may be performed easily.

What is claimed is:

1. A method of conversion-to-array for creating array configuration data by classifying the patterns congruent with a master pattern, which is a reference graphic for repetition, in the patterns arranged as mask patterns of a LSI, so that the number of the repetitions of the congruent pattern is the largest one when the congruent pattern is arranged repeatedly with a predetermined repetition pitch, comprising the steps of: selecting a predetermined number of patterns near a master pattern, which is a reference pattern for repetition, as candidate patterns from the patterns which are congruent with said master pattern and exist on the line in the X-direction on which said master pattern exists; computing the intervals between said master pattern and said candidate patterns as candidates of repetition pitches in the X-direction; computing the numbers of the repetitions in the X-direction of the patterns, on said line in the X-direction, which are repeated with said candidates of repetition pitches in the X-direction starting at said master pattern; and creating the X-direction array including the repetition pitch in the X-direction, for which said number of the repetitions in the X-direction is the largest one, in said candidates of repetition pitches, the number of the repetitions in the X-direction concerned, and said master pattern.

2. The method of conversion-to-array for creating array configuration data by classifying the patterns congruent with a master pattern, which is a reference graphic for repetition, in the patterns arranged as mask patterns of a LSI, so that the number of the repetitions of the congruent pattern is the largest one when the congruent pattern is arranged repeatedly with a predetermined repetition pitch, wherein the repetition pitch in case of the maximum number of the repetitions is selected from a plurality of predetermined candidates of the repetition pitch.

3. The method of conversion-to-array according to claim 2 comprising steps of:

selecting a predetermined number of patterns near a master pattern, which is a reference pattern for repetition, as candidate patterns from the patterns which are congruent with said master pattern and exist on the line in the X-direction on which said master pattern exists;

computing the intervals between said master pattern and said candidate patterns as candidates of repetition pitches in the X-direction;

computing the numbers of the repetitions in the X-direction of the patterns, on said line in the X-direction, which are repeated with said candidates of repetition pitches in the X-direction starting at said master pattern; and creating the X-direction array including the repetition pitch in the X-direction, for which said number of the repetitions in the X-direction is the largest one, in said candidates of repetition pitches, the number of the repetitions in the X-direction concerned, and said master pattern.

4. The method of conversion-to-array according to any one of claims 1 and 3 further comprising a step of taking one of the patterns which are not included in the created X-direction arrays as a further master pattern to create a further X-direction array.

5. The method of conversion-to-array according to claim 4 comprising steps of:

taking one of the X-direction arrays as a master array and selecting a predetermined number of X-direction arrays near said master array as candidate arrays from the arrays which are congruent with said master array and exist on the line in the Y-direction on which said master array exists;

computing the intervals between said master array and said candidate arrays as candidates of repetition pitches in the Y-direction;

computing the numbers of the repetitions in the Y-direction of the X-direction arrays, on said line in the Y-direction, which are repeated with said candidates of repetition pitches in the Y-direction starting at said master array; and creating the Y-direction array including the repetition pitch in the Y-direction, for which said number of the repetitions in the Y-direction is the largest one, in said candidates of repetition pitches in the Y-direction, the number of the repetitions in the Y-direction concerned, and said master array.

6. The method of conversion-to-array according to claim 5 further comprising a step of taking one of the X-direction arrays which are not included in the created Y-direction arrays as a further master array to create a further Y-direction array.

7. The method of conversion-to-array according to claim 6 further comprising a step of creating said array configuration data including a master pattern, the repetition pitch in X-direction and the number of repetitions in X-direction included in the X-direction array corresponding to said master pattern, and the repetition pitch in Y-direction and the number of repetitions in Y-direction included in the Y-direction array corresponding to said X-direction array.

* * * * *